Jan. 30, 1951     J. M. O'MALLEY     2,539,752
ROLLING MILL BEARING
Filed May 27, 1946     4 Sheets-Sheet 2
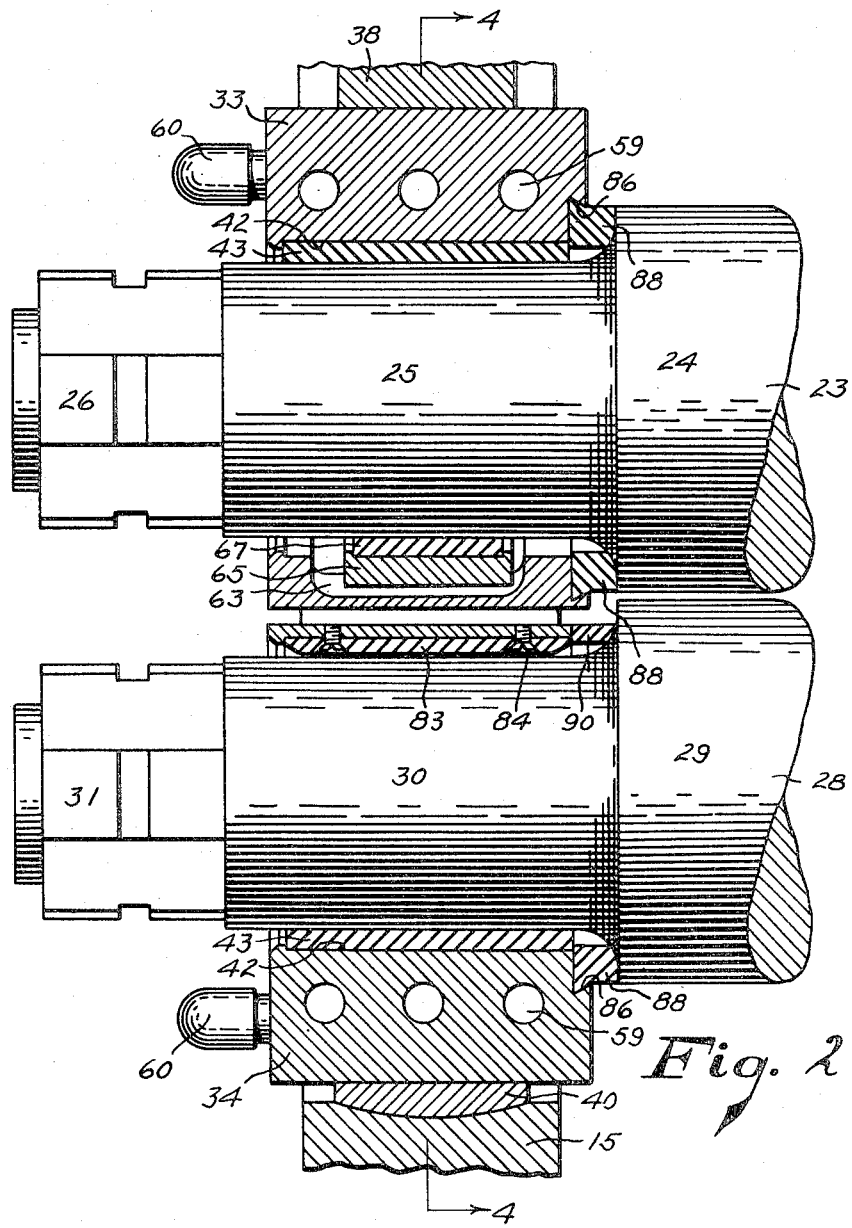
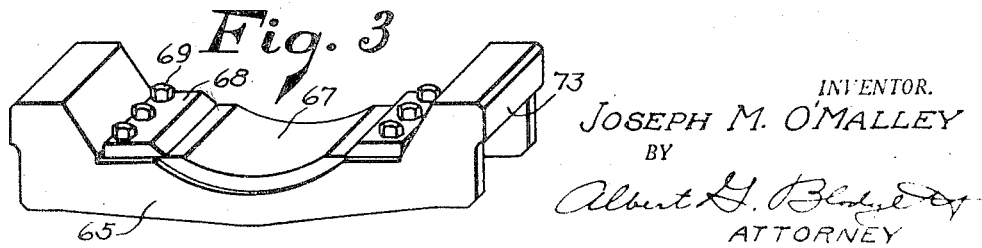
INVENTOR.
JOSEPH M. O'MALLEY Jan. 30, 1951  J. M. O'MALLEY  2,539,752
ROLLING MILL BEARING
Filed May 27, 1946  4 Sheets-Sheet 3

INVENTOR.
JOSEPH M. O'MALLEY
BY
Albert G. Blodgett
ATTORNEY

Jan. 30, 1951 J. M. O'MALLEY 2,539,752
ROLLING MILL BEARING
Filed May 27, 1946 4 Sheets-Sheet 4
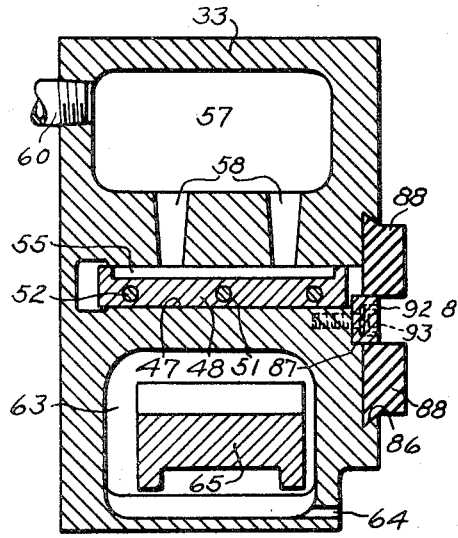
Fig. 6
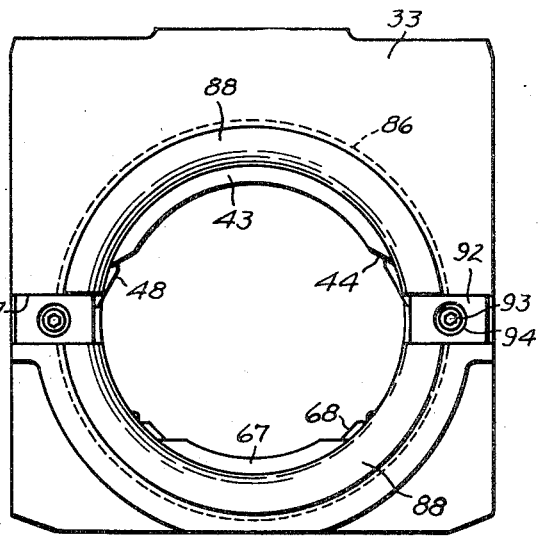
Fig. 7
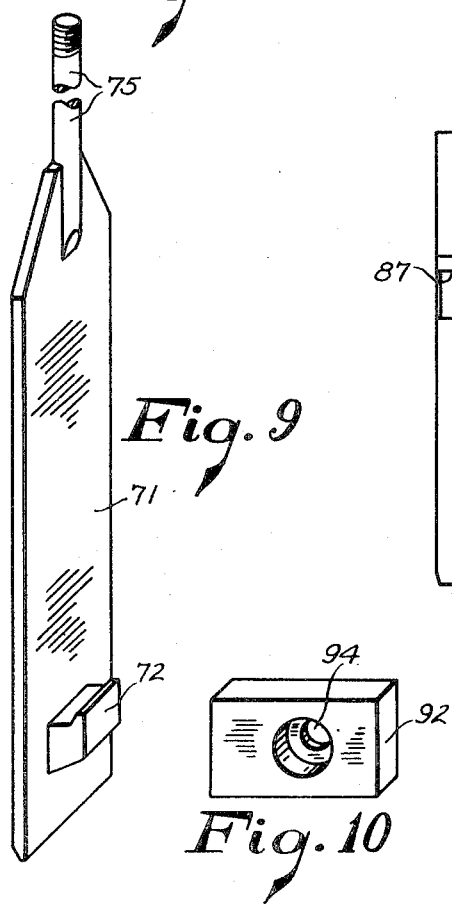
Fig. 9
Fig. 8
Fig. 10
INVENTOR.
JOSEPH M. O'MALLEY
BY
Albert G. Blodgett
ATTORNEY Patented Jan. 30, 1951

2,539,752

UNITED STATES PATENT OFFICE 2,539,752

ROLLING MILL BEARING

Joseph M. O'Malley, Worcester, Mass., assignor to Morgan Construction Company, Worcester, Mass., a corporation of Massachusetts Application May 27, 1946, Serial No. 672,355

9 Claims. (Cl. 308—121)

This invention relates to rolling mill bearings, and more particularly to the construction and arrangement of roll neck bearings of the water-lubricated type having bearing surfaces of phenolic resins or similar non-metallic materials.

It is one object of the invention to provide a roll neck bearing having means for applying the lubricating fluid to the bearing surfaces in a more effective manner.

It is a further object of the invention to provide a roll neck bearing which will be more effectively cooled than prior constructions.

It is a further object of the invention to provide a roll neck bearing which will be capable of withstanding heavy thrust loads throughout a long life of service.

It is a further object of the invention to provide a roll neck bearing which may be readily removed from the roll.

It is a further object of the invention to provide a roll neck bearing for use with the upper roll of a horizontal mill and having improved means for supporting the weight of the roll.

With these and other objects in view, as will be apparent to those skilled in the art, the invention resides in the combination of parts set forth in the specification and covered by the claims appended hereto.

Referring to the drawings illustrating one embodiment of the invention and in which like reference numerals indicate like parts, Fig. 1 is a side elevation of a horizontal rolling mill with the improved roll neck bearings mounted therein;

Fig. 2 is an enlarged section taken on the line 2—2 of Fig. 1;

Fig. 3 is a perspective view of a roll carrier forming a part of the upper bearing;

Fig. 6 is a section taken on the line 6—6 of Fig. 4;

Fig. 7 is an elevation of the upper bearing viewed from its inner end;

Fig. 8 is an elevation of the lower bearing viewed from its inner end;

Fig. 9 is a perspective view of a roll carrier strap; and

Fig. 10 is a perspective view of a thrust ring retainer key.

Figure 1:
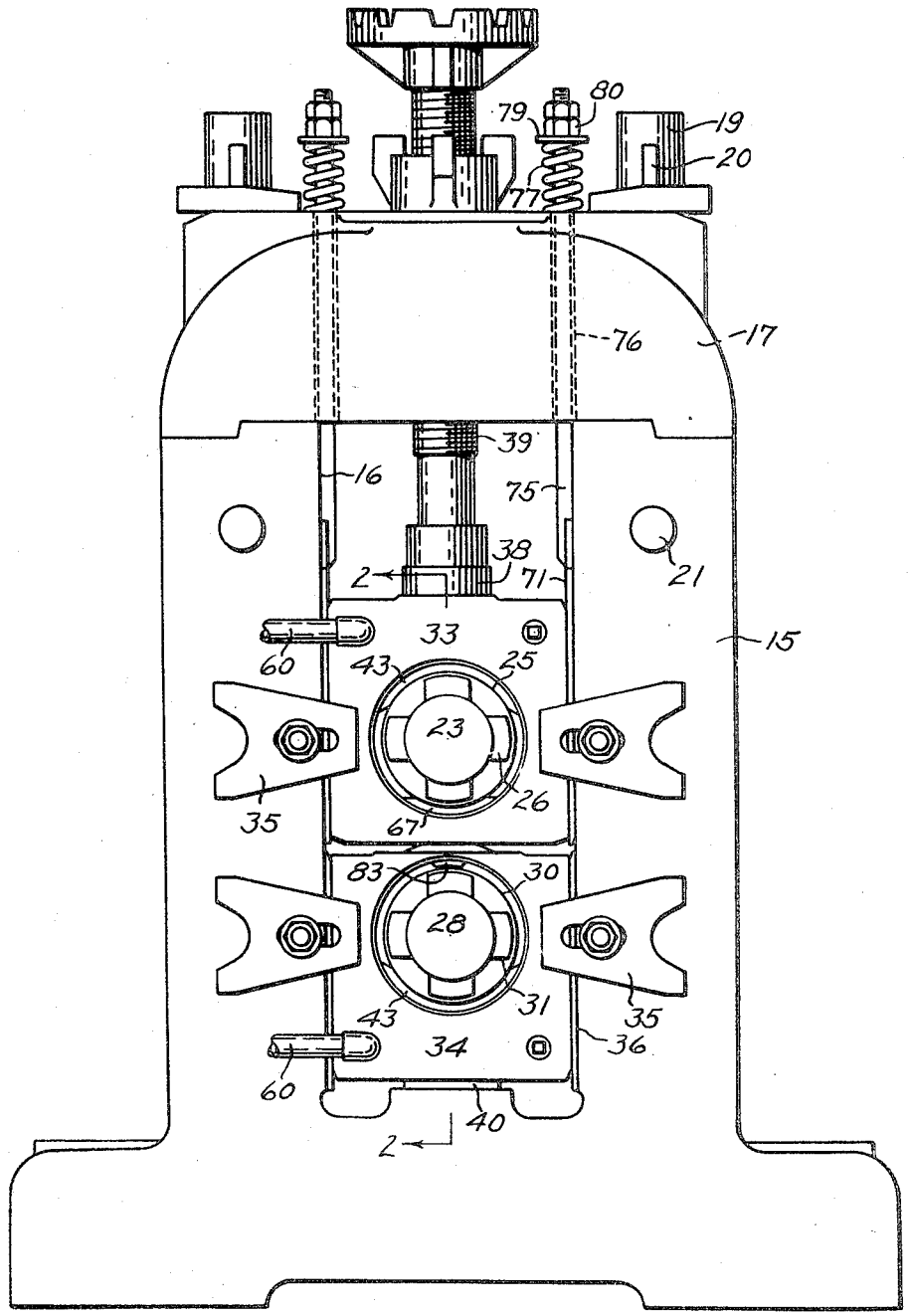

The embodiment illustrated comprises a horizontal rolling mill of the two-high type including a housing 15 shaped to provide the usual window 16 (Fig. 1) and having a removable cap 17. This cap is secured to the housing in a well-known manner by means of heavy vertical bolts 19 and wedges 20, the lower ends of the bolts being pivotally connected to the housing posts by pins 21. As best shown in Fig. 2, the mill also includes an upper roll 23 having a barrel 24, cylindrical roll neck 25, and wabbler 26, and a lower roll 28 having a barrel 29, cylindrical roll neck 30, and wabbler 31. The roll necks 25 and 30 are rotatably supported in upper and lower bearings 33 and 34 respectively, which are located in the housing window 16 and held in place by suitable clamps 35 (Fig. 1) on the outer face of the housing. Liner plates 36 are secured by screws 37 to the opposite sides of the window 16 adjacent the lower bearing 34. The top of the upper bearing 33 engages a block 38 on the lower end of a heavy vertical screw 39 mounted in the housing cap 17. The bottom of the lower bearing 34 rests on a rocker shoe 40 which is located in a concave recess in the adjacent portion of the housing.

Figure 4:
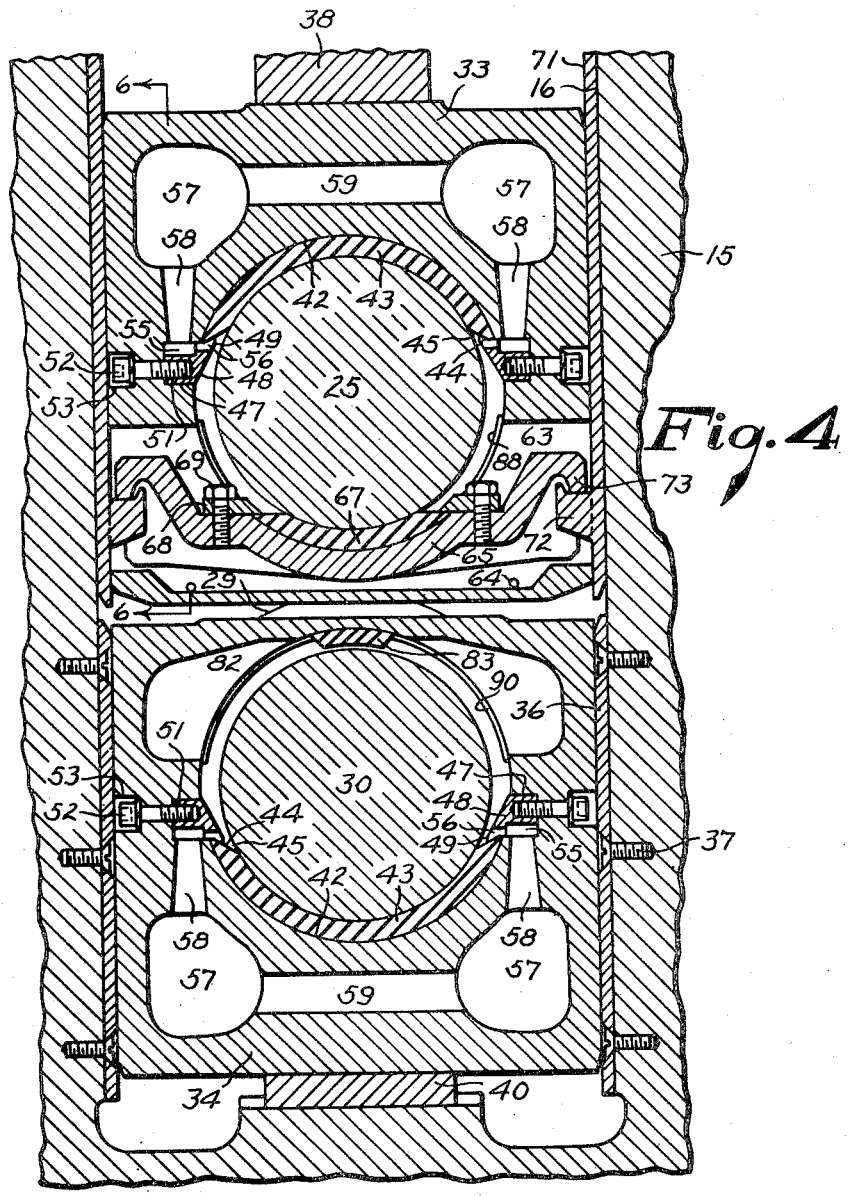
Fig. 4 is a section taken on the line 4—4 of Fig. 2.
Figure 5:
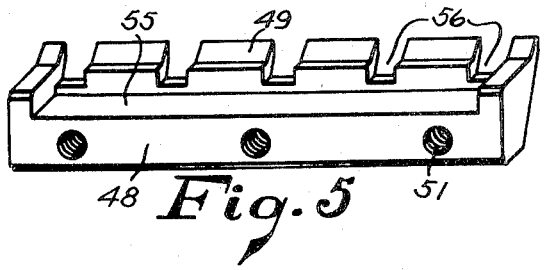
Fig. 5 is a perspective view of a bearing liner retainer.

Each of the bearings 33 and 34 is in the form of a heavy generally rectangular metal chock, preferably of cast steel, having a bore 42 extending horizontally therethrough to receive the corresponding roll neck 25 or 30, the bore being somewhat larger in diameter than the roll neck. Within this bore there is mounted an arcuate liner 43 of phenolic resin or other suitable non-metallic material having its inner concave cylindrical surface in engagement with the roll neck to receive the radial load resulting from the rolling pressure. In the axial direction this liner extends throughout nearly the entire length of the bearing, and circumferentially it extends through somewhat less than half the circle. The liner 43 is mounted against the upper surface of the bore 42 in the upper bearing 33, and against the lower surface of the bore in the lower bearing 34. As shown in Fig. 4, the side edges of each liner are provided with beveled surfaces 44 which face the adjacent outer surface of the roll neck to provide sharply converging grooves 45.

Means is provided to secure the liner 43 in position while permitting ready removal thereof when replacement is necessary. For this purpose two longitudinally extending grooves 47 are provided in the surface of the bore 42, adjacent the respective edges of the liner, the outer ends of the grooves being closed, as best shown in Fig. 6. Within each groove 47 there is mounted a bearing liner retainer 48 in the form of an elongated bar having a thin hook-like rib portion 49 along its inner edge which engages the beveled surface 44 of the liner. This bar has three tapped holes 51 therein in the side remote from the roll neck to receive screws 52 which extend through counterbored holes 53 in the sides of the bearing chocks 33 and 34.

The bars 48 serve not only as retainers for the liners 43 but also as means for distributing water to the bearing surfaces of the liners. For this purpose each bar is provided with a longitudinally extending recess 55 located adjacent the outer side of the rib 49, and this rib is formed with a series of notches 56 therethrough which provide water discharge orifices communicating with the recess. In order to supply water for delivery to these orifices two large chambers 57 are provided in the upper portion of the chock 33 at opposite sides of the axis, and two similar chambers 57 are provided in the lower portion of the chock 34, likewise at opposite sides of the axis. Each chamber 57 is connected to the adjacent groove 47, and thus to the recess 55, by two vertical passages 58. Preferably, the two chambers 57 in each bearing are connected to one another by three transverse horizontal passages 59 which are formed in the bearing adjacent the liner 43. Water is delivered to one of the chambers 57 in each bearing through a pipe 60. Approximately one-half the water thus supplied will flow through the passages 59 to the other chamber 57. From the chambers 57 the water will flow through the vertical passages 58 to the recesses 55 and thence through the notches 56 into the converging grooves 45. From one of these grooves, depending upon the direction of rotation, the water will be carried along by the roll neck 25 or 30 (as the case may be) in the form of a film to lubricate the concave surface of the bearing liner 43. The water will escape from the bearings around the outer ends of the roll necks.

Means is provided to support the weight of the upper roll 23, when no stock is passing between the rolls, and thus hold the roll neck 25 in contact with the liner 43 of the upper bearing 33. For this purpose the upper bearing is provided with a large cavity 63 which extends horizontally entirely through the lower portion of the bearing from one side thereof to the other and intersects the lower part of the bore 42. To ensure proper drainage of this cavity when the mill is shut down, two small holes 64 lead rearwardly from the bottom thereof through the rear wall of the bearing. Within the cavity 63 there is mounted a carrier 65 which extends horizontally beneath the roll neck. An upwardly concave segmental liner 67 of phenolic resin or the like is mounted on the upper surface of the carrier and attached thereto by clips 68 and screws 69. This liner engages the lower surface of the roll neck and is curved to fit the same properly. Two vertical plates 71 are located on opposite sides of the bearing 33 and in sliding contact with the bearing and with the sides of the housing window 16. These plates close the ends of the cavity 63 against the escape of water therefrom. On the inner surface of each plate 71 there is provided a hook-shaped block 72 which projects into the cavity 63, these blocks being located beneath and in engagement with transverse ribs 73 which extend downwardly from the adjacent ends of the carrier 65. Vertical rods 75 are welded or otherwise secured to the upper ends of the plates 71 and extend upwardly through openings 76 (Fig. 1) in the housing caps 17. The upper portions of these rods are surrounded by coiled compression springs 77 which are held in place by washers 79 and nuts 80 mounted on the threaded upper ends of the rods. These springs subject the rods to tension forces which support the carrier 65 and the weight of the upper roll.

The lower bearing 34 is formed with a transverse cavity 82 (Fig. 4) which extends horizontally in the upper portion of the bearing and intersects the upper part of the bore 42. To the upper wall of this cavity and directly above the roll neck 30 there is attached a pad or strip 83, by means of countersunk-head screws 84 (Fig. 2). This pad is made of phenolic resin or the like, and it serves to prevent possible damage to the roll neck during roll changing, through accidental contact of the roll neck with the metal surfaces of the bearing.

Not only do the improved bearings support radial loads but they also resist outward thrust or axial loads imposed thereon by the rolls during the operation of the mill. Thus, by employing similar bearings at opposite ends of the rolls, the rolls may be held in the proper location endwise, regardless of thrust loads resulting from unbalanced pass grooves or other causes. For this purpose each bearing 33 and 34 is provided in its inner face with an undercut annular groove 86 coaxial with the bore 42 and opening into the bore. This groove is interrupted at diametrically opposite points by two somewhat deeper rectangular grooves or slots 87, preferably located in the horizontal axial plane. It will be noted from Fig. 8 that the grooves 86 of the lower bearing is further interrupted by reason of its intersection with the top surface of the bearing. Within the undercut groove 86 of each bearing there are mounted two thrust ring segments of phenolic resin or the like arranged to project inwardly from the bearing and into engagement with the adjacent end or shoulder of the roll barrel 24 or 29, as the case may be. The two thrust ring segments for the upper bearing as well as the lower segment for the lower bearing, are each designated by the numeral 88. The upper segment 90 for the lower bearing is identical with the segments 88 except that it is flattened or cut away substantially flush with the top of the bearing in order to avoid interference with the upper bearing. Each of the thrust ring segments extends through slightly less than one half the circumference, and their ends are positioned adjacent the grooves 87, the latter being of sufficient width to permit insertion of the ring segments, one at a time, in the undercut grooves 86. In order to retain the ring segments in place, a key 92 is inserted in each groove 87 to engage the adjacent ends of the segments. Each key is fastened to the bearing by a hollow head screw 93 which extends through a counterbored hole 94 in the key. Since the two thrust ring segments for each bearing extend throughout nearly the entire circumference, they provide considerable thrust load capacity. Furthermore the load is symmetrically applied relative to the bearing axis, so that there is no tendency to tilt the bearing.

It will now be apparent that in the operation of the invention, water will enter one of the chambers 57 in each bearing from the pipe 60 connected thereto, and thence a portion of the water will flow through the horizontal passages 59 to the other chamber 57. From these chambers the water will travel through the vertical passages 58 to the recesses 55 and thence through the notches 56 to the converging grooves 45 to provide a lubricating film between the roll neck and the liner 43. The water flow through the several passages will aid materially in cooling the bearing. Some of the water will travel inwardly along the bore 42 to lubricate the thrust ring segments, and some water will escape from the bearing between the ends of the thrust ring segments, adjacent the keys 92. Most of the water however will escape from the outer end of the bore 42, through the annular clearance space surrounding the roll neck. When rolls are to be changed, the housing caps 17 may be lifted from the roll housings, and the upper bearings and the upper roll will remain suspended from the housing caps by the rods 75. The bearings are not attached to the rolls in any way, and it is accordingly a very simple matter to remove and replace the bearings. The bearings have ample capacity to support both radial and thrust loads, and the carriers 65 in the upper bearings will support the upper roll when no stock is passing through the mill.

Having thus described my invention, what I claim as new and desire to secure by Letters Patent is:

1. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, retainer means removably secured to the chock in engagement with the two side edges of the liner to hold the liner in position, the retainer means having orifices therethrough in position to discharge lubricant on the roll neck adjacent the side edges of the liner, and means to supply lubricant to the orifices.

2. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, the surface of the bore being interrupted by two longitudinally extending grooves adjacent the respective side edges of the liner, bars removably secured within the grooves in engagement with the side edges of the liner to hold the liner in position, the bars having orifices therethrough spaced along the lengths of the bars and in position to discharge lubricant on the roll neck adjacent the side edges of the liner, and means to supply lubricant to the orifices.

3. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, the side edges of the liner having beveled surfaces which face the adjacent surface of the roll neck to provide sharply converging grooves, retainer means removably secured to the chock in engagement with the two side edges of the liner to hold the liner in position, the retainer means having orifices therethrough in position to discharge lubricant into the said converging grooves, and means to supply lubricant to the orifices.

4. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, the side edges of the liner having beveled surfaces which face the adjacent surface of the roll neck to provide sharply converging grooves, the surface of the bore being interrupted by two longitudinally extending grooves adjacent the respective side edges of the liner, bars removably mounted within the longitudinally extending grooves in engagement with the side edges of the liner to hold the liner in position, the bars having orifices therethrough spaced along the lengths of the bars and in position to discharge lubricant into the said converging grooves, and means to supply lubricant to the orifices.

5. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, the side edges of the liner having beveled surfaces which face the adjacent surface of the roll neck to provide sharply converging grooves, the surface of the bore being interrupted by two longitudinally extending grooves adjacent the respective side edges of the liner, bars removably mounted within the longitudinally extending grooves and each having a thin hook-like rib portion along its inner edge which engages the adjacent beveled surface of the liner to hold the liner in position, the rib portion having a series of notches therethrough spaced along the bar for the discharge of lubricant into the said converging groove, and means to supply lubricant to the notches.

6. A rolling mill bearing comprising a chock having a bore therethrough to receive the cylindrical neck of a roll, an arcuate liner mounted within the bore to provide a concave cylindrical surface adapted to engage the roll neck and receive the radial load resulting from the rolling pressure, retainer means removably secured to the chock in engagement with the two side edges of the liner to hold the liner in position, the retainer means having orifices therethrough in position to discharge lubricant on the roll neck adjacent the side edges of the liner, the chock having two chambers connected by passages to the orifices of the respective retainer means and also connected to one another by other passages which extend transversely through the chock adjacent to the liner, and means to supply lubricant to one of the chambers.

7. A rolling mill bearing a chock having a bore therethrough to receive the cylindrical neck of a roll, an arcuate liner mounted within the bore to provide a concave cylindrical surface adapted to engage the roll neck and receive the radial load resulting from the rolling pressure, the surface of the bore being interrupted by two longitudinally extending grooves adjacent the respective side edges of the liner, bars removably secured within the grooves in engagement with the side edges of the liner to hold the liner in position, the bars being shaped to provide longitudinally extending recesses and orifices communicating with the recesses to discharge lubricant on the roll neck, the chock having two chambers connected by passages to the recesses of the respective bars and also connected to one another by other passages which extend transversely through the chock adjacent to the liner, and means to supply lubricant to one of the chambers.

8. A rolling mill bearing comprising a chock having a horizontal bore therethrough to receive the horizontal cylindrical neck of an upper roll, an arcuate liner mounted within the upper portion of the bore to provide a concave cylindrical surface adapted to engage the upper surface of the roll neck and receive the upward radial load resulting from the rolling pressure, the chock having a transverse horizontal cavity which extends entirely through the lower portion of the chock from one side thereof to the other and intersects the lower part of the bore, a carrier located within the cavity and extending horizontally beneath the roll neck, a liner mounted on the upper surface of the carrier to engage the lower surface of the roll neck, vertical plates located outside the chock and slidably engaging the opposite sides thereof in position to close the adjacent ends of the cavity, means connecting the plates to the adjacent ends of the carrier, and means to apply upward forces to the plates and thereby support the roll and the chock.

9. A rolling mill bearing comprising a chock having a horizontal bore therethrough to receive the horizontal cylindrical neck of an upper roll, an arcuate liner mounted within the upper portion of the bore to provide a concave cylindrical surface adapted to engage the upper surface of the roll neck and receive the upward radial load resulting from the rolling pressure, the chock having a transverse horizontal cavity which extends entirely through the lower portion of the chock from one side thereof to the other and intersects the lower part of the bore, a carrier located within the cavity and extending horizontally beneath the roll neck, a liner mounted on the upper surface of the carrier to engage the lower surface of the roll neck, vertical plates located outside the chock and slidably engaging the opposite sides thereof in position to close the adjacent ends of the cavity, hook-shaped blocks on the inner surfaces of the plates and extending into the cavity, ribs extending downwardly from the end portions of the carrier and engaging the tops of the blocks, and means to apply upward forces to the plates and thereby support the roll and the chock.

JOSEPH M. O'MALLEY.

REFERENCES CITED

The following references are of record in the file of this patent:

UNITED STATES PATENTS

| Number | Name | Date |
|---|---|---|
| 1,635,124 | Hoegg | July 5, 1927 |
| 1,686,872 | Miller | Oct. 9, 1928 |
| 2,459,826 | Martelloti | Jan. 25, 1949 |

FOREIGN PATENTS

| Number | Country | Date |
|---|---|---|
| 560,274 | Great Britain | Mar. 28, 1944 |